Sept. 24, 1963   L. H. RICE ET AL   3,104,887
ROLLER SKATE PLATE AND TRUCK MOUNTING ASSEMBLY
Filed May 19, 1961   2 Sheets-Sheet 1
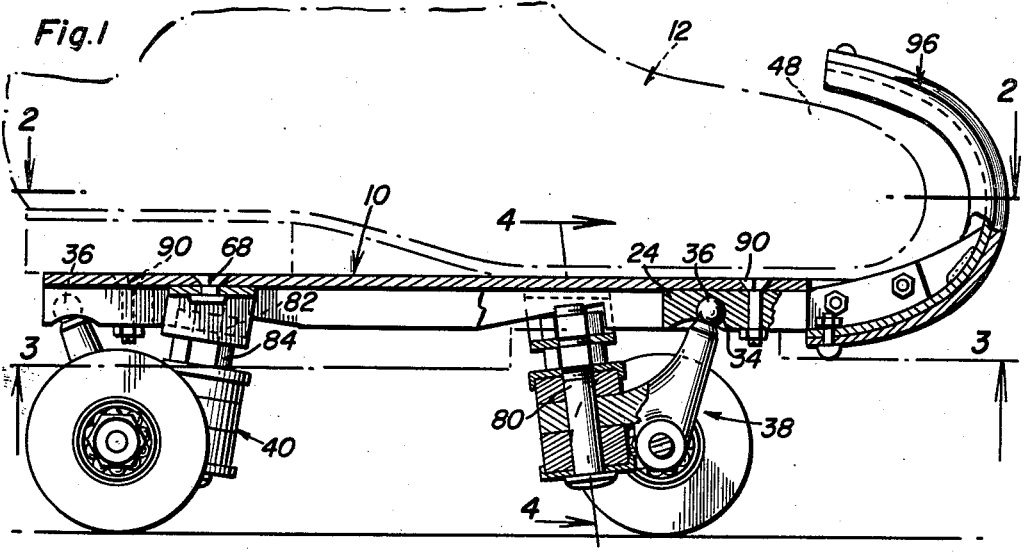
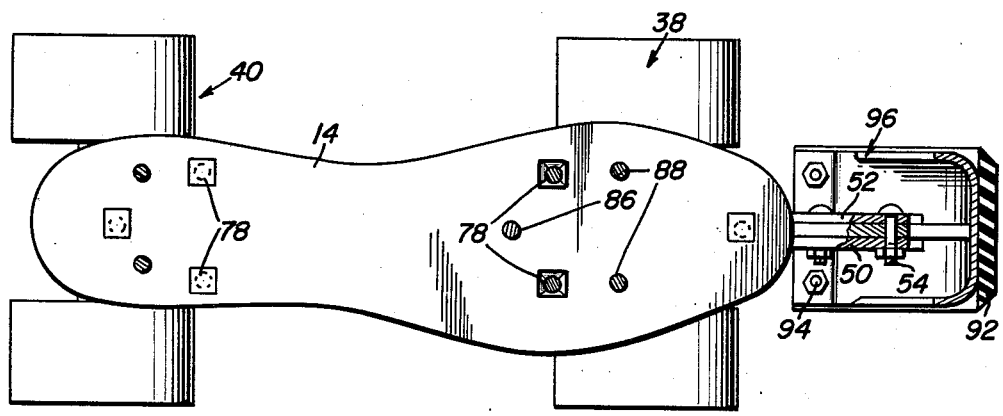
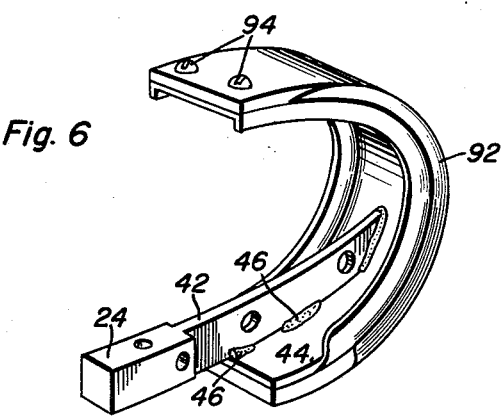
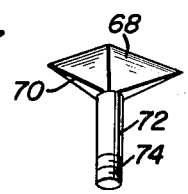
Leo H. Rice
Ira J. Rice
INVENTORS Sept. 24, 1963    L. H. RICE ET AL    3,104,887
ROLLER SKATE PLATE AND TRUCK MOUNTING ASSEMBLY
Filed May 19, 1961                                2 Sheets-Sheet 2

Leo H. Rice
Ira J. Rice
INVENTORS

BY Clarence A. O'Brien
and Harvey B. Jacobson
Attorneys

United States Patent Office 3,104,887
Patented Sept. 24, 1963

3,104,887
ROLLER SKATE PLATE AND TRUCK
MOUNTING ASSEMBLY
Leo H. Rice and Ira J. Rice, both of Highway 75,
Bellevue, Nebr.
Filed May 19, 1961, Ser. No. 111,358
5 Claims. (Cl. 280—11.2)

This invention relates to a novel and useful roller skate plate and truck mounting assembly and more specifically to a truck mounting assembly which may be readily manufactured by using simplified manufacturing processes and readily available materials.

The truck mounting assembly of the instant invention includes a mounting plate adapted for securement to the sole of a roller skate shoe and is provided with a forwardly directed and upwardly curving toe stop adapted to embrace the toe portion of a roller skate shoe secured to the mounting plate. The toe stop will embrace the toe portion of a skate shoe in a manner to protect the toe portion from wear and abuse and the truck mounting assembly is constructed in a manner whereby various component parts thereof may be readily serviced and replaced when desired and which enable truck mounting adjustments to be readily made upon truck assemblies secured to the mounting assembly.

The main object of this invention is to provide a novel and useful truck mounting assembly for roller skates which will greatly facilitate the adjustment of roller skate wheel truck assemblies.

A further object of this invention, in accordance with the immediately preceding object, is to provide a mounting assembly having component parts thereof adapted for securement to roller skate wheeled truck assemblies which may be readily serviced and replaced when desired.

Still another object of this invention is to provide a mounting assembly which may be readily manufactured by simple manufacturing processes.

A final object to be specifically enumerated herein is to provide a roller skate plate and truck mounting assembly which will conform to conventional forms of manufacture, be of simple construction and easy to install so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal vertical sectional view of the roller skate plate and truck mounting assembly of the instant invention shown with a pair of wheeled truck assemblies secured thereto and the mounting assembly secured to a roller skate shoe, the roller skate shoe being shown in phantom lines;

FIGURE 2 is a horizontal sectional view taken substantially upon the plane indicated by the section line 2—2 of FIGURE 1;

FIGURE 6 is a perspective view of the toe stop of the mounting assembly;

FIGURE 7 is a perspective view of one of the fasteners utilized to secure the mounting assembly to the mounting plate;

Figure 3:
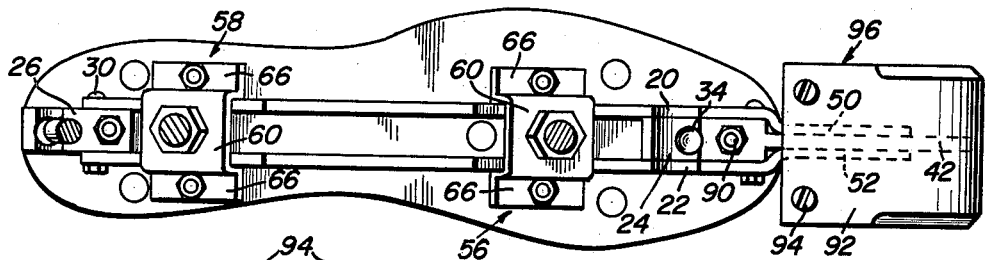
FIGURE 3 is a horizontal sectional view taken substantially upon the plane indicated by the section line 3—3 of FIGURE 1.
Figure 4:
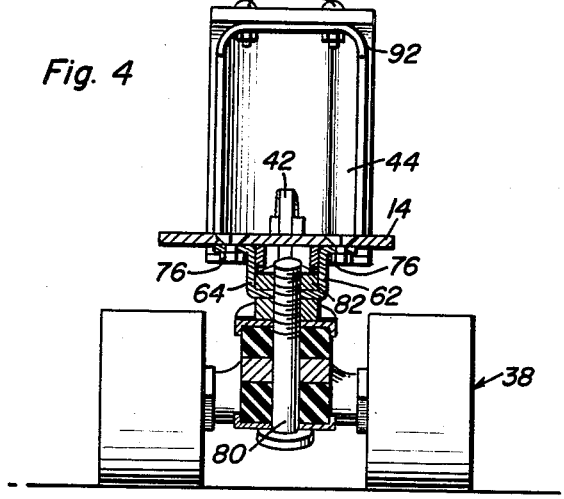
FIGURE 4 is a vertical transverse sectional view taken substantially upon the plane indicated by the section line 4—4 of FIGURE 1.
Figure 8:
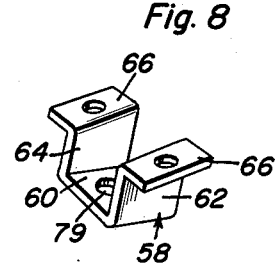
FIGURE 8 is a perspective view of one of the mounting means utilized to secure the mounting assembly to the skate mounting plate.

Referring now more specifically to the drawings the numeral 10 generally designates the roller skate plate and mounting assembly of the instant invention which is shown in FIGURE 1 of the drawings secured to a roller skate shoe generally referred to by the reference numeral 12.

Figure 5:
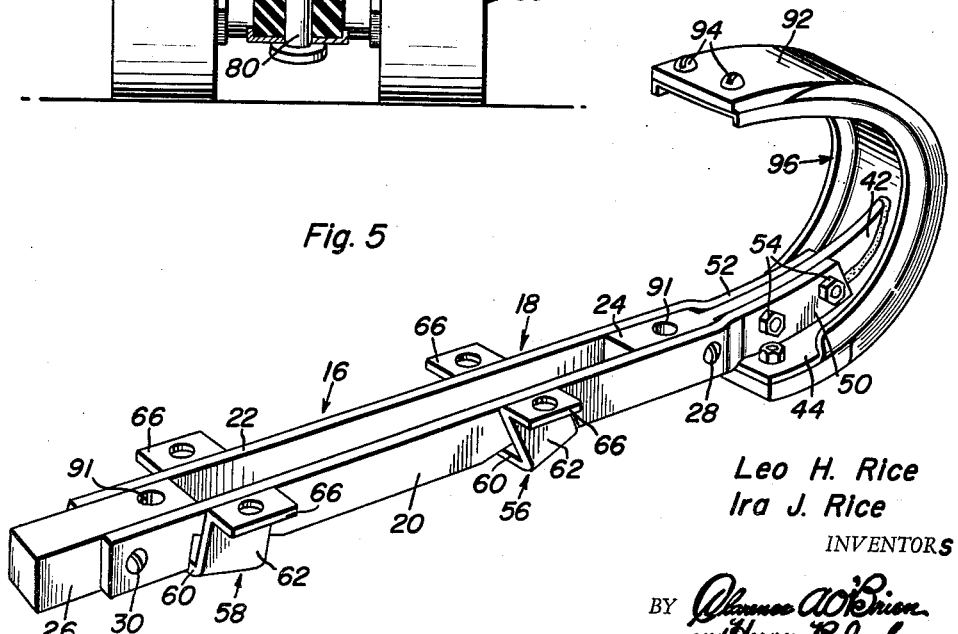
FIGURE 5 is a perspective view of the truck mounting assembly of the instant invention.

The roller skate plate and truck mounting assembly of the instant invention includes a mounting plate 14 adapted for securement to the sole of a roller skate shoe and a truck mounting assembly generally referred to by the reference numeral 16, see FIGURE 5. The truck mounting assembly 16 comprises an elongated mounting bar assembly generally referred to by the reference numeral 18 which includes a pair of upstanding parallel flanges 20 and 22. A pair of truck bearing blocks 24 and 26 comprise spacer blocks and are secured between the fore-and-aft portions of the flanges 20 and 22 respectively. The bearing blocks 24 and 26 are secured between the flanges 20 and 22 by means of suitable fasteners 28 and 30 which are secured through aligned apertures formed in the flanges 20 and 22 and bores (not shown) formed through the truck bearing blocks 24 and 26. It will be noted from FIGURE 1 of the drawings that each of the truck bearing blocks includes a downwardly opening blind recess 34 which swivelly receives the spherical bearing 36 carried by each of the forward and rear wheeled truck assemblies 38 and 40 respectively.

From FIGURE 6 of the drawings it will be noted that the front bearing block 24 includes a forwardly projecting shank portion 42 which curves slightly upwardly at its forward end and is secured to the concave inner surfaces of a longitudinally curved channel member generally referred to by the reference numeral 44 in any convenient manner such as by welding 46. It will be noted that the channel member 44 curves upwardly and back over the bearing block 24 and that it embracingly engages the toe portion 48 of the shoe 12 in spaced relation relative thereto. The forward ends of the flanges 20 and 22 include opposing inwardly offset apertured terminal end portions 50 and 52 respectively which embrace the shank 42 and are secured thereto by means of suitable fasteners 54 extending through the offset portions 50 and 52 in the shank 42. A pair of generally U-shaped mounts generally referred to by the reference numerals 56 and 58 are provided and each includes a bight portion 60 interconnected by means of a pair of legs 62 and 64 which embracingly engage longitudinally spaced portions of the parallel flanges 20 and 22. The legs 62 and 64 terminate at their upper ends in apertured outturned ear portions 66 by means of which the U-shaped mounts are adapted to be secured to the mounting plate 14 by means of suitable fasteners 68. The fasteners 68 each include a beveled square head portion 70 and a shank portion 72 which is externally threaded as at 74 at its lower end for engagement with an internally threaded nut 76. In this manner, the fasteners 68 are held stationary within the countersunk square openings 78 formed in the mounting plate 14. It will be noted that the bight portion 60 of the mount 56 is inclined forwardly and upwardly while the bight portion 60 of the mount 58 is inclined upwardly and rearwardly. The bight portions 60 are suitably apertured as at 79 and define forwardly and upwardly and rearwardly and upwardly inclined transversely extending mounting plates respectively to which the threaded shank portions 80 of the truck assemblies 38 and 40 may be secured by means of an internally threaded nut 82 and a jamnut 84. It is to be noted that the jamnut 82 is embracingly engaged between the legs 62 and 64 of the corresponding mount in order that the nuts 82 will be maintained in position against movement relative to the corresponding mount upon rotation of the corresponding shank 80.

It will be noted that the plate 14 may be secured to the sole of the shoe 12 by means of suitable fasteners 86 which are secured through the apertures 88 formed in the plate 14 and that each of the bearing blocks 24 and 26 may be independently secured to the mounting plate 14 by means of fasteners 90 similar to fasteners 68 which have their shank portions secured through the bores 91 formed through the truck bearing blocks 24 and 26. The channel member 44 has a covering 92 of resilient material secured to the outer convex surface thereof by means of suitable fasteners 94. The toe stop, generally referred to by the reference numeral 96 and defined by the channel member 44 and the covering 92, may be utilized in the conventional manner.

Thus it may be seen that herein is described a roller skate plate and mounting assembly which may be constructed utilizing extremely simple manufacturing processes and which may be utilized to secure wheeled trucks to a roller skate shoe in a manner whereby mounting adjustments of the wheeled trucks may be readily made thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A roller skate plate and truck mounting bar assembly and the mounting assembly comprising a sole mounting plate adapted for securement to the sole of a roller skate shoe, an elongated mounting bar assembly, means removably securing said bar assembly to said mounting plate, a pair of socket defining truck bearing blocks removably secured to the forward and rear end portions of said elongated mounting bar assembly, the forward one of said pair of bearing blocks including a forwardly extending upwardly curved integral projection thereon extending beyond the forward end of the mounting plate, and a curved channel member toe stop secured to the curved projection and extending upwardly and rearwardly so as to embrace the toe portion of a roller skate shoe secured to said mounting plate.

2. The combination of claim 1 wherein said mounting bar assembly includes a pair of independent upright and parallel flanges extending longitudinally of said mounting plate, said truck bearing blocks being removably secured between adjacent end portions of said flanges and defining spacer blocks therefor.

3. The combination of claim 2 wherein said forwardly extending projection is of less width than the forward bearing block and the forward ends of the mounting bar flanges are each offset inwardly so as to embrace the extending projection, said projection being secured thereto by a plurality of fasteners extending through both flanges and the extending projection.

4. The combination of claim 3 including a covering of resilient material secured to the convex outer surface of said curved channel member.

5. A roller skate plate and truck mounting assembly comprising a sole mounting plate adapted for securement to the sole of a roller skate shoe, an elongated mounting bar assembly, means removably securing said bar assembly to said mounting plate, a pair of socket defining truck bearing blocks removably secured to the forward and rear end portions of said elongated mounting bar assembly, the forward one of said pair of bearing blocks including a forwardly extending upwardly curved integral projection thereon extending beyond the forward end of the mounting bar assembly and the mounting plate, and a curved toe stop secured to the curved projection and extending upwardly and rearwardly so as to embrace the toe portion of a roller skate shoe secured to said mounting plate.

References Cited in the file of this patent

UNITED STATES PATENTS

| 2,016,847 | Wylie | Oct. 8, 1935 |
| 2,232,195 | Allred | Feb. 18, 1941 |
| 2,454,321 | Howard | Nov. 23, 1948 |
| 2,510,722 | Snyder | June 6, 1950 |
| 2,696,989 | Kleinman | Dec. 14, 1954 |
| 2,719,723 | Ware | Oct. 4, 1955 |

FOREIGN PATENTS

| 28,427 | Great Britain | of 1908 |
| 598,444 | Great Britain | Feb. 18, 1948 |
| 580,962 | France | Sept. 16, 1924 |
| 930,820 | France | Sept. 1, 1947 |
| 1,125,607 | France | July 16, 1956 |